United States Patent
Brita

(10) Patent No.: US 11,926,690 B2
(45) Date of Patent: Mar. 12, 2024

(54) PRECURSORS AND CATALYST COMPONENTS FOR THE POLYMERIZATION OF OLEFINS

(71) Applicant: BASELL POLIOLEFINE ITALIA S.R.L., Milan (IT)

(72) Inventor: Diego Brita, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 492 days.

(21) Appl. No.: 17/281,441

(22) PCT Filed: Sep. 17, 2019

(86) PCT No.: PCT/EP2019/074766
§ 371 (c)(1),
(2) Date: Mar. 30, 2021

(87) PCT Pub. No.: WO2020/069847
PCT Pub. Date: Apr. 9, 2020

(65) Prior Publication Data
US 2021/0395401 A1  Dec. 23, 2021

(30) Foreign Application Priority Data
Oct. 1, 2018 (EP) .................................... 18197881

(51) Int. Cl.
| | | |
|---|---|---|
| C08F 4/02 | (2006.01) | |
| B01J 27/138 | (2006.01) | |
| B01J 35/02 | (2006.01) | |
| C08F 4/654 | (2006.01) | |
| C08F 10/00 | (2006.01) | |

(52) U.S. Cl.
CPC ............... *C08F 4/022* (2013.01); *C08F 4/02* (2013.01); *C08F 4/6545* (2013.01); *C08F 10/00* (2013.01); *B01J 27/138* (2013.01); *B01J 35/023* (2013.01); *C08F 2410/06* (2021.01)

(58) Field of Classification Search
CPC .... B01J 27/138; B01J 35/0006; B01J 35/023; B01J 35/08; B01J 2231/122; B01J 31/00; C08F 4/022; C08F 4/02; C08F 4/6545; C08F 10/00; C08F 2410/06
USPC ............... 502/104, 115, 117, 118, 132, 134, 502/226–228
See application file for complete search history.

(56) References Cited

U.S. PATENT DOCUMENTS

| | | |
|---|---|---|
| 4,399,054 A | 8/1983 | Ferraris et al. |
| 4,469,648 A | 9/1984 | Ferraris et al. |
| 4,829,034 A | 5/1989 | Iiskolan et al. |
| 5,100,849 A | 3/1992 | Miya et al. |
| 5,488,022 A | 1/1996 | Takahashi |
| 6,103,655 A * | 8/2000 | Luciani .................... C08F 10/00 502/118 |
| 6,200,922 B1 * | 3/2001 | Huffer ..................... C08F 10/00 526/158 |
| 7,388,061 B2 | 6/2008 | Gao et al. |
| 10,870,718 B2 * | 12/2020 | Denifl ..................... C08F 4/654 |
| 2005/0119427 A1 | 6/2005 | Wei et al. |
| 2006/0046927 A1 | 3/2006 | Klendworth et al. |
| 2011/0183097 A1 | 7/2011 | Barre et al. |

FOREIGN PATENT DOCUMENTS

| | | |
|---|---|---|
| EP | 395083 A2 | 10/1990 |
| EP | 553805 A1 | 8/1993 |
| EP | 553806 A1 | 8/1993 |
| EP | 601525 A1 | 6/1994 |
| JP | H4226108 A | 8/1992 |
| JP | 2003137919 A | 5/2003 |
| JP | 2003201310 A | 7/2003 |
| KR | 100272738 B1 | 11/2000 |
| WO | 9844009 A1 | 10/1998 |
| WO | 02051544 A1 | 7/2002 |
| WO | 2009080568 A2 | 7/2009 |
| WO | 2010078494 A2 | 7/2010 |
| WO | 2011061134 A1 | 5/2011 |
| WO | 2018210665 A1 | 11/2018 |
| WO | 2019052900 A1 | 3/2019 |

OTHER PUBLICATIONS

International Search Report and Written Opinion dated Dec. 16, 2019 (dated Dec. 16, 2019) for Corresponding PCT/EP2019/074766.

* cited by examiner

*Primary Examiner* — Patricia L. Hailey

(57) ABSTRACT

A Ziegler-Natta catalyst component precursor made from or containing a mechanical mixture of (a) distinct particles of adducts of formula $MgCl_2(R^1OH)_n$ where R is a $C_1$-$C_8$ alkyl group and n is from 0.2 to 6 having average particle size (P50a) ranging from 5 to 100 μm; and (b) from 0.2 to 5.0% by weight of distinct particles of a solid compound containing more than 50% by weight of Sift units and having average particle size (P50b), wherein the ratio P50b/P50a ranges from 0.4 to 1.5.

15 Claims, No Drawings

PRECURSORS AND CATALYST COMPONENTS FOR THE POLYMERIZATION OF OLEFINS

This application is the U.S. National Phase of PCT International Application PCT/EP2019/074766, filed Sep. 17, 2019, claiming benefit of priority to European Patent Application No. 18197881.8, filed Oct. 1, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to Ziegler-Natta catalyst component precursors and the methods for the preparation thereof.

BACKGROUND OF THE INVENTION

In some instances, Ziegler-Natta catalyst components are used for the stereospecific polymerization of olefins, such as propylene. In some instances, the catalyst preparation involve the use of a precursor to be reacted with a titanium compound and optionally with an internal electron donor compound.

In some instances, the precursor is made from or containing adducts of formula $MgCl_2(R^1OH)_n$ where R is a 8 alkyl group and n is from 2 to 6. In further instances, the $C_1$-$C_8$ alkyl group is ethyl. The adducts have a particle size from about 5 to about 100 µm. In some instances, the adduct particles are subject to cohesiveness problems that worsen flowability and decrease the homogeneous distribution of the precursor particles during catalyst preparation.

To address these issues, use of slip agents such as stearates or erucamide is suggested. In some instances, the coating of catalyst or carrier particles with a layer of nanoparticles made of conductive material, such as carbon black, is suggested.

SUMMARY OF THE INVENTION

In a general embodiment, the present disclosure provides a ZN catalyst component precursor made from or containing a mechanical mixture of: (a) distinct particles of adducts of formula $MgCl_2(R^1OH)_n$ where $R^1$ is a $C_1$-$C_8$ alkyl group and n is from 0.2 to 6 having average particle size (P50a) ranging from 5 to 100 µm; and (b) from 0.2 to 5.0% by weight of distinct particles of a solid compound containing more than 50% by weight of Sift units and having average particle size (P50b), wherein the ratio P50b/P50a ranges from 0.4 to 1.5. In some embodiments, the $C_1$-$C_8$ alkyl group is ethyl.

DETAILED DESCRIPTION OF THE INVENTION

As used herein, the term "mechanical mixture" refers to the particles of adduct (a) being distinct and separate from the particles of solid compound (b). The particles of adduct (a) and the particles of compound (b) are brought into contact with each other by mechanical mixing.

In some embodiments, the solid compound (b) has average particle size (P50b) ranging from 2 to 50 µm, alternatively from 10 to 40 µm, alternatively from 15 to 30 µm.

In some embodiments, the solid compound (b) is selected from the group consisting of silica, silicates and diatomaceous earth. In some embodiments, the silicates are phyllosilicates. In some embodiments, the phyllosilicate is talc.

In some embodiments, the silica is hydrophilic silica (containing residual hydroxy groups). In some embodiments, the silica is hydrophobic silica wherein OH groups are replaced with SiOR groups.

In some embodiments, the solid compound (b) is diatomaceous earth. In some embodiments, the diatomaceous earth is commercially available under the tradename Celite®.

In some embodiments, the average particle size of the adduct (a), expressed as (P50a), ranges from 10 to 100 µm, alternatively from 15 to 80 µm, alternatively from 15 to 60 µm.

As used herein, the values of P50a and P50b refer to the powder samples, excluding aggregates. In some embodiments, powder samples free from aggregates are obtained by subjecting the powder to mechanical rolling or ultrasound treatment.

In some embodiments, the ratio P50b/P50a ranges from 0.60 to 1.50, alternatively from 0.75 to 1.50, alternatively from 0.8 to 1.3.

In some embodiments, the amount of particles of solid compound (b) ranges from 0.5 to 5.0 wt %, alternatively from 0.75% to 4.0 wt %, alternatively from 1.0 to 3.0 wt %, based on the total weight of mixture (a)+(b).

In some embodiments, the adduct (a) is prepared by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the spherical adducts are prepared as described in U.S. Pat. Nos. 4,469,648 4,399,054, Patent Cooperation Treaty Publication No. WO98/44009 or Patent Cooperation Treaty Publication No. WO02/051544. In some embodiments, the method for spherulization is spray cooling as described in U.S. Pat. Nos. 5,100,849 and 4,829,034.

In some embodiments, the adducts are $MgCl_2 \cdot (EtOH)_m$ adducts, wherein m is from 0.15 to 1.5, have a particle size ranging from 10 to 100 µm, and are obtained by subjecting the adducts with a higher alcohol content to a thermal dealcoholation process carried out in nitrogen flow at temperatures between 50 and 150° C. until the alcohol content is reduced to the above value. In some embodiments, the process is as described in European Patent No. EP395083.

In some embodiments, the dealcoholation is carried out chemically by contacting the adduct with compounds reacting with the alcohol groups.

In some embodiments, the dealcoholated adducts are characterized by a porosity (measured by mercury method) due to pores with radius up to 1 µm ranging from 0.15 to 2.5 cm³/g, alternatively from 0.25 to 1.5 cm³/g.

In some embodiments, adducts particles (a) have a prevailing spherical shape. In some embodiments, the adducts particles (a) have a sphericity factor higher than 0.60, alternatively higher than 0.70. As used herein, the sphericity factor is calculated using image analysis.

In some embodiments, the precursor is made from or containing the dry mixture of distinct particles of adduct (a) and the distinct particles of solid compound (b) is prepared with a blending method. In some embodiments, the blending method includes dry blending the two solids. In some embodiments, the dry blending is carried out at room temperature for a time ranging from 0.2 to 20 hours, alternatively from 0.5 to 15 hours, alternatively from 0.5 to 5 hours in a nitrogen environment.

In some embodiments, the dry precursor is prepared by stirring a liquid hydrocarbon slurry of the particles (a) and (b) and afterwards removing the liquid phase followed by drying the particles.

It is believed that break and avalanche energy are inversely related to the powder flowability. Lower values indicate higher flowability. In some embodiments, the precursors show percentage of improvement in term of break energy of 10% or higher, alternatively 20% or higher, alternatively higher than 30%, with respect to the particles of adducts (a) as such. In some embodiments, the precursors show percentage of improvement in term of avalanche energy of 25% or higher, alternatively 50% or higher, alternatively higher than 60%, with respect to the particles of adducts (a) as such. In some embodiments, the sum of percentage of improvement in terms of break and avalanche energy is higher than 35%, alternatively higher than 60%, alternatively higher than 80%.

In some embodiments, the precursors are used to prepare solid catalyst components. In some embodiments, the solid catalyst component is prepared by reacting a titanium compound of formula $Ti(OR^2)_{m-y}X_y$, where m is the valence of titanium and y is a number between 1 and m and $R^2$ is a C1-C10 alkyl group, with the precursors. In some embodiments, the Ti compound is $TiCl_4$. In some embodiments, the reaction with the Ti compound is carried out by suspending the solid mixtures in cold $TiCl_4$; the mixture is heated up to 80-130° C. and kept at this temperature for 0.5-2 hours. In some embodiments, the temperature of the cold $TiCl_4$ is 0° C. In some embodiments, the treatment with $TiCl_4$ is carried out one or more times. In some embodiments, the electron donor compound is added during the treatment with $TiCl_4$. In some embodiments, the preparation of catalyst components in spherical form is as described in European Patent Application Nos. EP-A-395083, EP-A-553805, EP-A-553806, EPA601525 or Patent Cooperation Treaty Publication No. WO98/44009.

In some embodiments, the solid catalyst component is made from or containing from 8 to 30%, alternatively from 10 to 25% wt, of Mg, based on the total weight of solid catalyst component. In some embodiments, the amount of Ti ranges from 0.1 to 8%, alternatively from 0.5 to 5%, alternatively from 0.7 to 3% wt, based on the total weight of the solid catalyst component.

In some embodiments, the catalyst components is further made from or containing an electron donor compound (internal donor). In some embodiments, the electron donor compound is selected from the group consisting of esters, ethers, amines, silanes, carbamates and ketones or mixtures thereof.

In some embodiments, the internal donor is selected from the group consisting of alkyl and aryl esters of optionally substituted aromatic mono or polycarboxylic acids and esters of aliphatic acids. In some embodiments, the aromatic mono or polycarboxylic acids are selected from benzoic and phthalic acids. In some embodiments, the aliphatic acids are selected from the group consisting of malonic, glutaric, maleic and succinic acids. In some embodiment, the esters are selected from the group consisting of n-butylphthalate, di-isobutylphthalate, di-n-octylphthalate, ethyl-benzoate and p-ethoxy ethyl-benzoate. In some embodiments, the esters are selected from the diesters disclosed in Patent Cooperation Treaty Publication No. WO2010/078494 and U.S. Pat. No. 7,388,061. In some embodiments, the diesters are selected from the group consisting of 2,4-pentanediol dibenzoate derivatives and 3-methyl-5-t-butyl catechol dibenzoates. In some embodiments, the internal donor is selected from the group consisting of diol derivatives. In some embodiments, the diol derivatives are selected from the group consisting of dicarbamates, monoesters monocarbamates and monoesters monocarbonates. In some embodiments, the electron donor compound is selected from the group of 1,3 diethers of the formula:

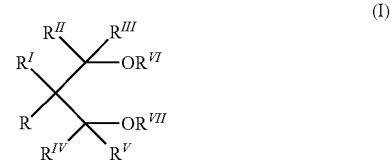

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of R—$R^V$ except that $R^{VI}$ and $R^{VII}$ cannot be hydrogen. In some embodiments, one or more of the R—$R^{VII}$ groups are linked to form a cycle. In some embodiments, the 1,3-diethers have $R^{VI}$ and $R^{VII}$ selected from $C_1$-$C_4$ alkyl radicals.

In some embodiments, mixtures of the donors are used. In some embodiments, the mixtures are made from or contain esters of succinic acids and 1,3 diethers as described in Patent Cooperation Treaty Publication No. WO2011/061134.

In some embodiments and to increase the capability of the catalyst to distribute an olefin co-monomer within a polymer chain, the electron donor is selected from the group consisting of monofunctional donors. In some embodiment, the monofunctional donors is selected from the group consisting of ethers and esters. In some embodiments, the ethers are $C_2$-$C_{20}$ aliphatic ethers. In some embodiments, the ethers are cyclic ethers, alternatively cyclic ethers having 3-5 carbon atoms. In some embodiments, the cyclic ethers are selected from the group consisting of tetrahydrofuran and dioxane. In some embodiments, the esters are $C_1$-$C_4$ alkyl esters of aliphatic mono carboxylic acids. In some embodiments, the esters are selected from the group consisting of ethylacetate and methyl formiate. In some embodiments, the cyclic ether is tetrahydrofuran. In some embodiments, the ester is ethylacetate.

In some embodiments, the final amount of electron donor compound in the solid catalyst component ranges from 0.5 to 40% by weight, alternatively from 1 to 35% by weight.

In some embodiments, the solid catalyst components is converted into catalysts for the polymerization of olefins by reacting the solid catalyst components with organoaluminum compounds.

In some embodiments, the organo aluminum compounds are selected among alkyl-Al compounds, alternatively trialkyl aluminum compounds. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, the organo aluminum compounds are alkylaluminum halides, alkylaluminum hydrides or alkylaluminum sesquichlorides. In some embodiments, the alkylaluminum sesquichlorides are selected from the group consisting of $AlEt_2Cl$ and $Al_2Et_3Cl_3$. In some embodiments, the alkylaluminum halides, alkylaluminum hydrides or alkylaluminum sesquichlorides are used in mixture with trialkylaluminums. In some embodiments, the Al/Ti ratio is higher than 1, alternatively between 50 and 2000.

In some embodiments, the catalyst is further made from or containing an external donor. In some embodiment, the external donor is selected from the group consisting of silicon compounds, ethers, esters, amines, heterocyclic compounds and ketones. In some embodiment, the external donor is 2,2,6,6-tetramethylpiperidine. In some embodiment, the external donor is selected from the group consisting of silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. In some embodiments, the silicon compounds have a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group. In some embodiments, $R_8$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, and methyl(3,3,3-trifluoro-n-propyl)dimethoxysilane. In some embodiments, the silicon compounds have a is 0, c is 3, $R_7$ is a branched alkyl or cycloalkyl group, optionally containing heteroatoms, and $R_8$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (iii) is used in such an amount to give a molar ratio between the organoaluminum compound and the electron donor compound (iii) of from 0.1 to 500, alternatively from 1 to 300, alternatively from 3 to 100.

In some embodiments, the present disclosure provides a process for the homopolymerization or copolymerization of olefins $CH_2=CHR$, wherein R is hydrogen or a hydrocarbyl radical with 1-12 carbon atoms, carried out in the presence of a catalyst made from or containing the product of the reaction between:
  (i) the solid catalyst component;
  (ii) an alkylaluminum compound and,
  (iii) optionally an electron-donor compound (external donor).

In some embodiments, the polymerization process is carried out by slurry polymerization using as diluent an inert hydrocarbon solvent, or bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization is carried out at temperature of from 20 to 120° C., alternatively from 40 to 80° C. In some embodiments, the polymerization is carried out in gas-phase with an operating pressure ranging from 0.5 and 5 MPa, alternatively from 1 to 4 MPa. In some embodiments, the polymerization is carried out in bulk polymerization with an operating pressure ranging from 1 to 8 MPa, alternatively from 1.5 to 5 MPa.

The following examples are given in order to better illustrate the disclosure without limiting it.

Characterization

Average Particle Size

Determined by a method based on the principle of the optical diffraction of monochromatic laser light with the "Malvern Instruments 2000" apparatus. The average size is given as P50. P10 and P90 are also determined with this method.

The Malvern Mastersizer 2000 particle size analyzer is divided into three units:
  1) an optical unit; Optical core unit for measurements of solids of sizes ranging from 0.02 to 2000μ, equipped with two laser beam sources: red He/Ne laser, power 5 mw, wave length 633 nm, blue (diode) laser, wave length 450 nm.
  2) a sampling unit; Hidro 2000S automatic Sampling Unit for volumes between 50 and 120 ml, operating with internal capacity, centrifuge pump, stirrer and ultrasound probe with 40 W power output.
  3) a PC console; Portable LG Pentium series, using Malvern Professional software for Windows 2000 or NT. Method of data elaboration using Mie optics theory (Refractive Index for sample=1.596; Refractive Index for n-heptane=1.39).

Method Description

For the measurements described herein, n-heptane (plus 2 g/l antistatic Span 80) was used as dispersing agent.

The measuring cell was loaded with dispersing agent, while pump/agitator speed was set up to 2205 RPM. Background measurement was then taken. Then sample was loaded, by using a dedicated loader for solids or slurries. At that point, before being subject to PS Determination, the sample underwent 30 seconds of ultrasound treatment. The measurement was taken.

Determination of Break Energy and Avalanche Energy

Measurements were carried out with a Revolution Powder Analyzer (Mercury Scientific Inc., Newtown, CT, USA). Specific measurement conditions are provided in the user manual revised on Aug. 30, 2014.

Determination of Sphericity Factor

The determination was carried out with the image analyzer commercial software Analysis Pro 3.2 which describes the sphericity of a particle using an algorithm applied to a source of image constituted by a SEM picture the dimension of which was selected based on the average size of the catalyst particle, thereby including a statistically representative number of particles. For the catalyst sample having average particle size of 70 μm, the size of the picture was 2.5×2.5 mm. For the catalyst sample having particle size of about 9 μm, the size of the picture was 150 μm×150 μm.

Starting $MgCl_2$-EtOH Particles (Component (a) of the Solid Mixture

Three different lots of microspheroidal $MgCl_2 \cdot 2.8C_2H_5OH$ were prepared according to the method described in Patent Cooperation Treaty Publication No. WO2/051544 having the following P50:
  Lot A 28 μm.
  Lot B 34 μm.
  Lot C 20 μm
  Compounds (b)
  The following compounds were used:
  Celite® diatomaceous earth having P50 of 22 μm, which was commercially available from Sigma-Aldrich;
  Silica S5631 having mean particle 0.9 μm, which was commercially available from Fluka;

Gasil AB 200DF amorphous silica having a P50 size of 8 µm, which was commercialized by PQ corporation;
Gasil AB 735 amorphous silica having a P50 size of 24 µm, which was commercialized by PQ corporation;
Silica H30 having a P50 size of 22 µm, which was commercialized by Wacker Chemie AG;
Silica T30 having a P50 size of 23 µm, which was commercialized by Wacker Chemie AG; and
Silica T40 having a P50 size of 33 µm, which was commercialized by Wacker Chemie AG.

EXAMPLES

Examples 1-2 and Comparative Example 1

A series of three mixtures was prepared by dry mixing the lot A of the solid adduct with the specific amount reported in Table 1 of Celite®. The blending was carried out as follows. 100 grams of the solid catalyst component were introduced in a 1 L glass bottle and then, the amount of Celite® reported in Table 1 was also added.
The solids were mixed by tumbling the bottle for 1 h at 60 rpm. The resulting mixtures were subject to energy break and avalanche energy determination, and the results are reported in Table 1.

Examples 3-6 and Comparative Examples 2-7

The mixtures were prepared as described in Examples 1-2 with the difference that the compounds (b) reported in Table 1 were used. The resulting mixtures were subject to energy break and avalanche energy determination, and the results are reported in Table 1.

Examples 7-13 and Comparative Examples C8-C10

The mixtures were prepared as described in Examples 1-2 with the difference that Examples Lot B of adduct (a) was used instead of Lot A, and the SiO$_2$ based unit compounds reported in Table 1 were used instead of Celite®. The resulting mixtures were subject to energy break and avalanche energy determination, and the results are reported in Table 1.

Examples 14-24 and Comparative Example C11

The mixtures were prepared as described in Examples 1-2 with the difference that Lot C of adduct (a) was used instead of Lot A, and the SiO$_2$ based unit compounds reported in Table 1 were used instead of Celite®. The resulting mixtures were subject to energy break and avalanche energy determination, and the results are reported in Table 1.

TABLE 1

| Ex. | Catalyst Lot | Additional compound Type. | Amount % wt. | Break Energy Kj/Kg. | % Impr. | Avalanche energy Kj/Kg. | % Impr. |
|---|---|---|---|---|---|---|---|
| C1 | A | — | — | 68 | — | 32.3 | |
| 1 | " | Celite | 1 | 61 | 10 | 22 | 32 |
| 2 | " | " | 2 | 61 | 10 | 21 | 35 |
| 3 | | H30 | 0.5 | 45 | 34 | 15 | 54 |
| 4 | | " | 0.75 | 45.5 | 33 | 11 | 66 |
| 5 | " | " | 1 | 48 | 29 | 11 | 66 |
| 6 | " | " | 2 | 54 | 21 | 10 | 69 |
| C2 | " | S5631 | 0.5 | 76 | −12 | 37 | −15 |
| C3 | " | | 1 | 89 | −31 | 38 | −18 |
| C4 | " | | 2 | 64 | 6 | 25 | 22 |
| C5 | " | Ca Stearate | 3 | 69 | −1 | 31 | 4 |
| C6 | " | Erucamide | 2 | 68 | 0 | 33 | −2 |
| C7 | " | Mg Stearate | 3 | 71 | −4 | 29 | 10 |
| C8 | B | — | | 74 | — | 40 | — |
| 7 | B | T30 | 1 | 46 | 38 | 20 | 50 |
| 8 | " | HDK T40 | 1 | 54 | 27 | 19 | 53 |
| 9 | " | " | 2 | 52 | 30 | 19 | 53 |
| 10 | " | " | 3 | 39 | 47 | 11 | 73 |
| 11 | " | Gasil AB735 | 1 | 58 | 22 | 15 | 63 |
| 12 | " | " | 2 | 58 | 22 | 8.3 | 79 |
| 13 | " | " | 3 | 51 | 31 | 8 | 80 |
| C9 | " | Gasil AB200DF | 1 | 73 | 1 | 36 | 10 |
| C10 | " | Gasil AB200DF | 2 | 69 | 7 | 32 | 20 |
| C11 | C | Gasil AB200DF | — | 91.2 | — | 57.0 | – |
| 14 | " | HDK T30 | 1 | 68.6 | 25 | 42 | 26 |
| 15 | " | " | 2 | 57.0 | 38 | 27 | 53 |
| 16 | " | " | 3 | 55.2 | 39 | 19 | 67 |
| 17 | " | HDK H30 | 1 | 57.1 | 37 | 19.4 | 66 |
| 18 | " | " | 2 | 56.1 | 38 | 12.8 | 78 |
| 19 | " | " | 3 | 67.8 | 26 | 11.2 | 80 |
| 20 | " | Gasil AB200DF " | 2 | 64 | 30 | 40 | 30 |
| 21 | " | Gasil AB200DF " | 3 | 57 | 38 | 23 | 60 |
| 22 | " | Gasil AB735 | 1 | 55 | 40 | 15 | 74 |
| 23 | " | " | 2 | 43 | 53 | 19 | 84 |
| 24 | " | " | 3 | 45 | 51 | 10 | 82 |

What is claimed is:

1. A Ziegler-Natta catalyst component precursor comprising:
a mechanical mixture of
(a) distinct particles of adducts of formula $MgCl_2(R^1OH)_n$ where $R^1$ is a $C_1$-$C_8$ alkyl group, and n is from 0.2 to 6 having average particle size (P50a) ranging from 5 to 100 μm and
(b) from 0.2 to 5.0% by weight, based on the total weight of mixture (a)+(b), of distinct particles of a solid compound containing more than 50% by weight of $SiO_2$ units and having average particle size (P50b),
wherein the ratio P50b/P50a ranges from 0.4 to 1.5.

2. The Ziegler-Natta catalyst component precursor of claim 1, wherein the solid compound (b) is selected from silica, silicates and diatomaceous earth and mixtures thereof.

3. The Ziegler-Natta catalyst component precursor of claim 2, wherein the solid compound (b) is silica.

4. The Ziegler-Natta catalyst component precursor of claim 1 wherein the average particle size of the adduct (a), expressed as (P50a), ranges from 10 to 100 μm.

5. The Ziegler-Natta catalyst component precursor of claim 4, wherein the average particle size of the adduct (a), expressed as (P50a), ranges from 15 to 80 μm.

6. The Ziegler-Natta catalyst component precursor of claim 1, wherein the ratio P50b/P50a ranges from 0.60 to 1.50.

7. The Ziegler-Natta catalyst component precursor of claim 6, wherein the P50b/P50a ranges from 0.75 to 1.50.

8. The Ziegler-Natta catalyst component precursor of claim 1, wherein the amount of particles of solid compound (b) ranges from 0.5 to 5.0 wt %, based on the total weight of mixture (a)+(b).

9. The Ziegler-Natta catalyst component precursor of claim 8, wherein the amount of particles of solid compound (b) ranges from 0.75 to 4.0 wt %, based on the total weight of mixture (a)+(b).

10. The Ziegler-Natta catalyst component precursor of claim 9, wherein the amount of particles of solid compound (b) ranges from 1.0 to 3.0 wt %, based on the total weight of mixture (a)+(b).

11. The Ziegler-Natta catalyst component precursor of claim 1, wherein the average particle size (P50b) of the solid compound (b) ranges from 2 to 50 μm.

12. The Ziegler-Natta catalyst component precursor of claim 11, wherein the average particle size (P50b) of the solid compound (b) ranges from 10 to 40 μm.

13. A solid catalyst component for the polymerization of olefins obtained by reacting a titanium compound of formula $Ti(OR^2)_{m-y}X_y$, where m is the valence of titanium and y is a number between 1 and m and $R^2$ is a $C_1$-$C_{10}$ alkyl group, with the Ziegler-Natta catalyst component precursor according to claim 1.

14. The solid catalyst component of claim 13 further comprising an internal donor selected from the group consisting of esters, ethers, amines, silanes, carbamates and ketones or mixtures thereof.

15. A catalyst system for the homopolymerization or copolymerization of olefins $CH_2=CHR$, wherein R is hydrogen or a hydrocarbyl radical with 1-12 carbon atoms, comprising the product obtained by reacting:
the solid catalyst component according to claim 13;
(ii) an alkylaluminum compound and,
optionally an external electron donor compound.

* * * * *